United States Patent
Kim (10) Patent No.: US 10,428,951 B2
(45) Date of Patent: Oct. 1, 2019

(54) DUST PREVENTING SEAL AND CONSTRUCTION MACHINE HAVING THE SAME

(71) Applicant: DOOSAN INFRACORE CO., LTD., Incheon (KR)

(72) Inventor: Jin-Uk Kim, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 308 days.

(21) Appl. No.: 15/243,967

(22) Filed: Aug. 23, 2016

(65) Prior Publication Data
US 2017/0059041 A1    Mar. 2, 2017

(30) Foreign Application Priority Data
Aug. 28, 2015  (KR) .................. 10-2015-0121670

(51) Int. Cl.
*F16J 15/32* (2016.01)
*F16J 15/3236* (2016.01)
*F16J 15/3284* (2016.01)
*F16J 15/06* (2006.01)

(52) U.S. Cl.
CPC ......... *F16J 15/3236* (2013.01); *F16J 15/061* (2013.01); *F16J 15/3284* (2013.01)

(58) Field of Classification Search
CPC .. F16J 15/3232; F16J 15/3268; F16J 15/3224; F16J 15/3236
USPC ......................................................... 277/567
See application file for complete search history.

(56) References Cited

U.S. PATENT DOCUMENTS

| | | | | |
|---|---|---|---|---|
| 2,470,925 A | * | 5/1949 | Fredrickson | E03D 3/04 277/438 |
| 2,798,624 A | * | 7/1957 | Brown | B65F 3/205 414/525.4 |
| 2,892,644 A | * | 6/1959 | Collins | F16J 15/32 251/324 |
| 3,076,667 A | * | 2/1963 | Klingler | F16L 17/073 285/147.1 |
| 3,078,110 A | * | 2/1963 | Starr | F16J 15/0881 277/614 |
| 3,183,009 A | * | 5/1965 | Kunel | F16J 15/3232 277/399 |
| 3,273,729 A | * | 9/1966 | Holpainen | A01G 23/006 414/694 |
| 3,642,248 A | * | 2/1972 | Benware | F16K 1/2266 251/172 |
| 3,955,859 A | * | 5/1976 | Stella | F16J 15/3232 384/215 |
| 4,047,273 A | * | 9/1977 | Biondetti | D21G 1/022 492/7 |

(Continued)

FOREIGN PATENT DOCUMENTS

| | | |
|---|---|---|
| CN | 201891108 U | 7/2011 |
| CN | 203008009 U | 6/2013 |

*Primary Examiner* — Kristina R Fulton
*Assistant Examiner* — L. Susmitha Koneru
(74) *Attorney, Agent, or Firm* — Hauptman Ham, LLP (57) ABSTRACT

A dust preventing seal may include a body and first and second dust lips. The body may be installed at a locking portion between an arm and a bucket of a construction machine. The body may have an annular shape. The first and second dust lips may be protruded from an outer surface of the body to the outside.

5 Claims, 6 Drawing Sheets

(56) References Cited

U.S. PATENT DOCUMENTS

| | | | | |
|---|---|---|---|---|
| 4,165,859 | A * | 8/1979 | Maciulaitis | F16K 25/00 251/173 |
| 4,344,632 | A * | 8/1982 | Green | F16K 1/2266 251/173 |
| 4,434,909 | A * | 3/1984 | Ott | A47J 27/0806 220/293 |
| 4,461,488 | A * | 7/1984 | Harms | B62D 55/0887 277/380 |
| 4,474,381 | A * | 10/1984 | Wilkins | E21B 17/08 277/614 |
| 5,261,677 | A * | 11/1993 | Gotoh | F16J 15/32 277/438 |
| 5,294,091 | A * | 3/1994 | van Eck | F16K 31/602 251/105 |
| 5,518,257 | A * | 5/1996 | Breaker | F16J 15/127 277/612 |
| 7,784,837 | B2 * | 8/2010 | Williams | F16L 23/06 285/342 |
| 8,196,603 | B2 * | 6/2012 | Wilke | F16J 15/3236 137/597 |
| 8,814,219 | B2 * | 8/2014 | Hennemann | F16L 37/088 285/319 |
| 8,955,484 | B2 * | 2/2015 | Ishii | F02B 27/0252 123/184.44 |
| 9,951,870 | B2 * | 4/2018 | Mueller-Niehuus | F16J 15/164 |
| 2003/0102635 | A1 * | 6/2003 | Akita | E02F 9/006 277/549 |
| 2009/0010580 | A1 * | 1/2009 | Gaumer | F16C 33/1065 384/322 |
| 2011/0019949 | A1 * | 1/2011 | Akita | E02F 9/006 384/147 |
| 2012/0286477 | A1 * | 11/2012 | Klousia | E02F 3/3604 277/500 |

* cited by examiner

DUST PREVENTING SEAL AND CONSTRUCTION MACHINE HAVING THE SAME

CROSS REFERENCE TO RELATED APPLICATION

This application claims the priority of Korean Patent Application No. 10-2015-0121670, filed on Aug. 28, 2016 in the KIPO (Korean Intellectual Property Office), the contents of which are hereby incorporated by reference in their entirety.

BACKGROUND

1. Field

Example embodiments relate to a dust preventing seal and a construction machine having the same. More particularly, example embodiments relate to a dust preventing seal arranged between a boom and an arm of a construction machine, and a construction machine having the dust preventing seal.

2. Description of the Related Art

A construction machine such as an excavator may perform various operations using a plurality of attachments. For example, a bucket may be used for an excavating operation, a flattening operation, a loading operation, etc. The bucket may be connected to an arm.

However, a connecting portion between the arm and the bucket may be exposed to external environments. Thus, dusts such as soils, stones, etc., may infiltrate into the connection portion. The dusts may wear the connection portion to generate a breakdown of the excavator.

SUMMARY

Example embodiments provide a dust preventing seal arranged between an arm and a bucket of a construction machine to prevent infiltrations of dusts.

Example embodiments also provide a construction machine having the above-mentioned dust preventing seal.

According to example embodiments, there may be provided a dust preventing seal. The dust preventing seal may include a body and first and second dust lips. The body may be installed at a locking portion between an arm and a bucket of a construction machine. The body may have an annular shape. The first and second dust lips may be protruded from an outer surface of the body to the outside.

In example embodiments, the body may have a semi-circular cross section. The body may have a semi-circular inner surface configured to make contact with the arm and the bucket, and a linear outer surface exposed to the outside.

In example embodiments, the locking portion may have a V-shaped chamfer.

In example embodiments, the arm and the bucket in the locking portion may have corners inclined at an angle of about 45° to about 50°.

In example embodiments, the body may be received in the locking portion having the V shape.

In example embodiments, a distance between an end of the first dust lip and an end of the second dust lip may be shorter than a width of the locking portion having the V shape.

In example embodiments, the first and second dust lips may have a gradually decreased thickness from the outer surface of the body to the outside.

In example embodiments, the first and second dust lips may have outer surfaces exposed to the outside for making contact with dusts. The outer surfaces of the first and second dust lips may be inclined to the outer surface of the body by an angle of about 55° to about 70°. The first and second dust lips may have inner surfaces configured to make contact with the locking portion. The inner surfaces of the first and second dust lips may be inclined to the outer surface of the body by an angle of about 50° to about 60°.

According to example embodiments, there may be provided a construction machine. The construction machine may include a connecting member and a dust preventing seal. The connection member may be partially received in a hole of the arm to connect the arm with the bucket. The dust preventing seal may include a body and first and second dust lips. The body may be installed at a locking portion between the arm and the bucket. The body may have an annular shape. The first and second dust lips may be protruded from an outer surface of the body to the outside.

In example embodiments, the locking portion may have a V-shaped chamfer. The dust preventing seal may be received in the chamfer.

In example embodiments, the body may have a semi-circular cross section. The first and second dust lips may be protruded from an outer surface having a linear shape of the body.

According to example embodiments, the dust preventing seal may function as to prevent the dusts from infiltrating into the connection portion between the arm and the bucket. Particularly, the dust preventing seal may be elastically deformed in proportion to an increase of the dusts so that the dust preventing seal may closely make contact with the arm and the bucket to definitely prevent the infiltrations of the dusts.

BRIEF DESCRIPTION OF THE DRAWINGS

Example embodiments will be more clearly understood from the following detailed description taken in conjunction with the accompanying drawings. FIGS. 1 to 6 represent non-limiting, example embodiments as described herein.

DETAILED DESCRIPTION OF THE EMBODIMENTS

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
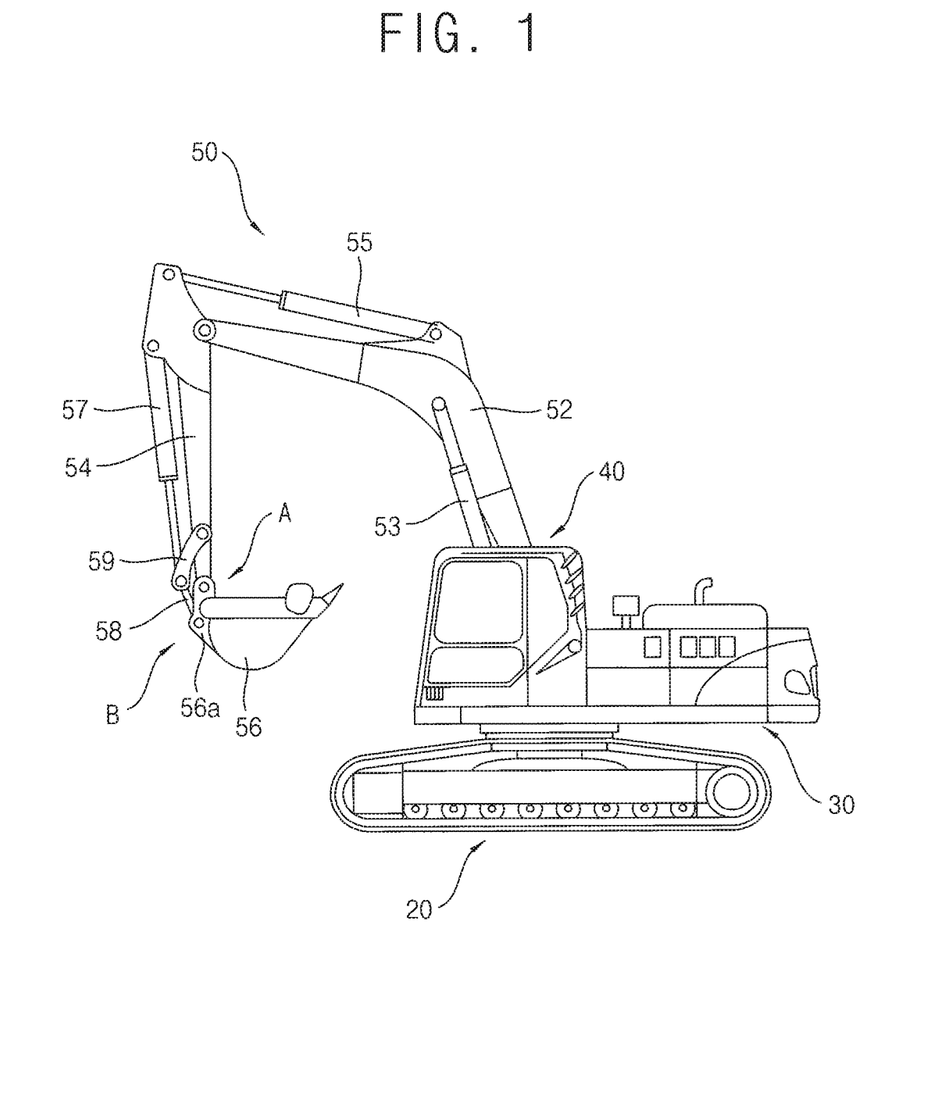
FIG. 1 is a side view illustrating a construction machine in accordance with example embodiments.

FIG. 1 is a side view illustrating a construction machine in accordance with example embodiments. Although FIG. 1 illustrates an excavator, applications of a dust preventing seal of example embodiments may not be restricted within the excavator. The dust preventing seal of example embodiments may be applied to a wheel loader, fork lift, etc. Hereinafter, the dust preventing seal may be applied to the excavator 10 for convenience of explanations.

Referring to FIG. 1, the excavator 10 may include a lower cartridge 20, an upper swing unit 30 rotatably connected to the lower cartridge 20, a cabin 40 installed on the upper swing unit 30 to provide a boarding space of a worker and a working tool 50 connected to the upper swing unit 30.

The working tool 50 may include a boom 52, a boom cylinder 53 for driving the boom 52, an arm 54, an arm cylinder 55 for driving the arm 54, a bucket 56 and a bucket cylinder 57 for driving the bucket 56. The bucket 56 may include a bucket-combining member 56a. The arm 54 may be combined with the bucket-combining member 56a at a first locking portion A. For example, the arm 54 may be combined with the bucket-combining member 56a using a connecting member such as a bush. Thus, the bucket 56 may be rotated with respect to the first locking portion A.

The working tool 50 may further include a push link 58 connected between the bucket cylinder 57 and the bucket-combining member 56a, and a guide link 59 connected between the bucket cylinder 57 and the arm 54.

The push link 58 and the guide link 59 may be pivotally connected with the bucket cylinder 57. The push link 58 may be fixed to the bucket-combining member 56a at a second locking portion B. The guide link 59 may be fixed to the arm 54. The push link 58 may push and pull the bucket 56 in accordance with length changes of the bucket cylinder 57 so that the bucket 56 may perform a crowd operation and a dump operation.

Figure 2:
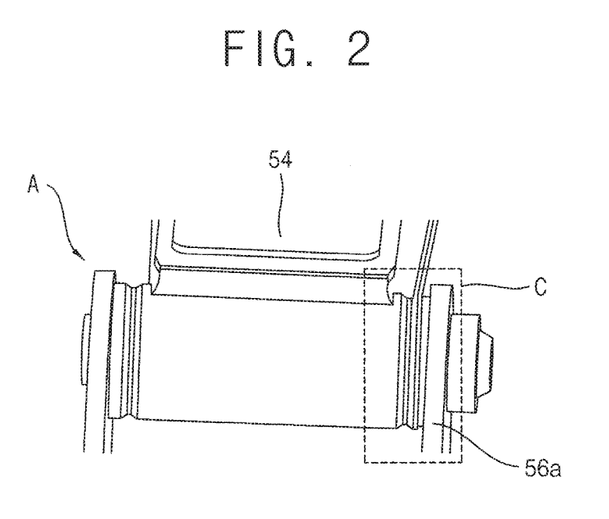
FIG. 2 is a front view illustrating a portion "A" in FIG. 1.
Figure 3:
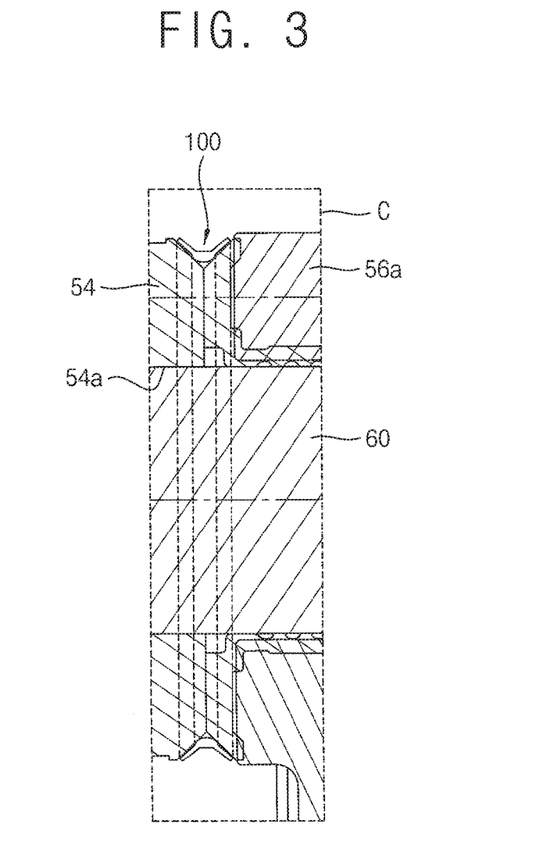
FIG. 3 is a front view illustrating a portion "C" in FIG. 2.
Figure 4:
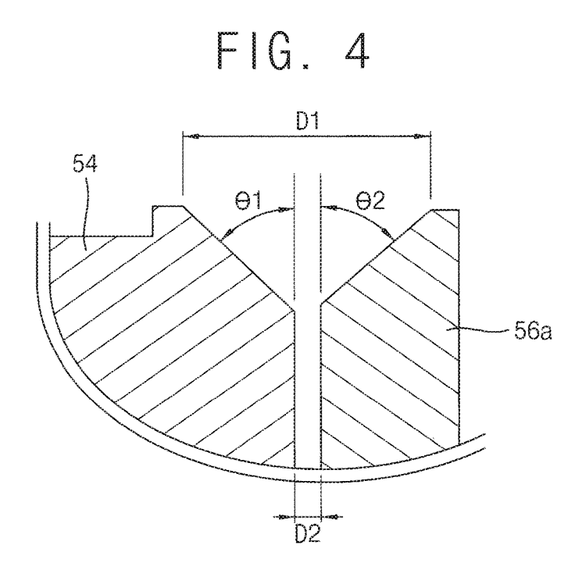
FIG. 4 is a cross-sectional view illustrating a locking portion between an arm and a bucket in accordance with example embodiments.
Figure 5:
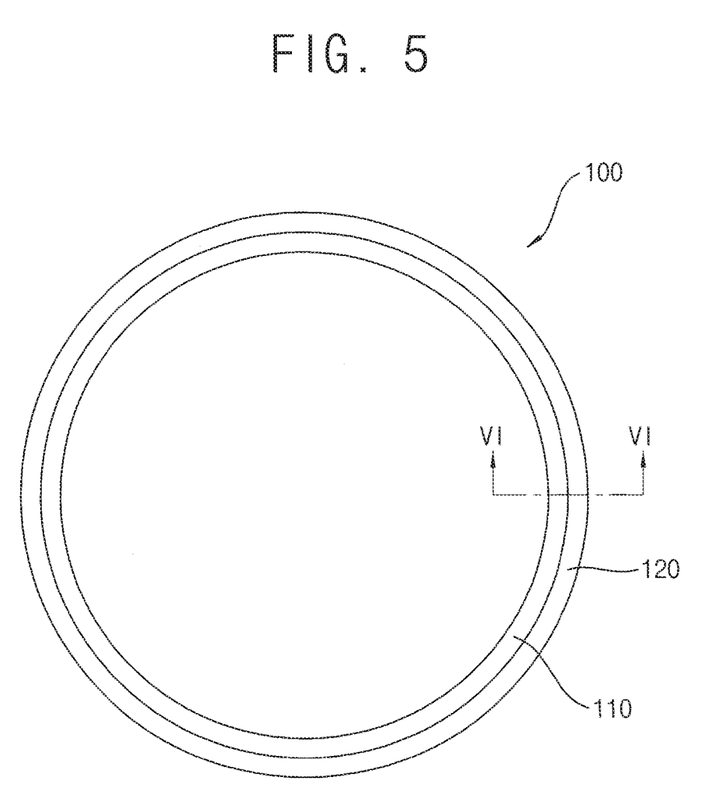
FIG. 5 is a plane view illustrating a dust preventing seal in accordance with example embodiments.
Figure 6:
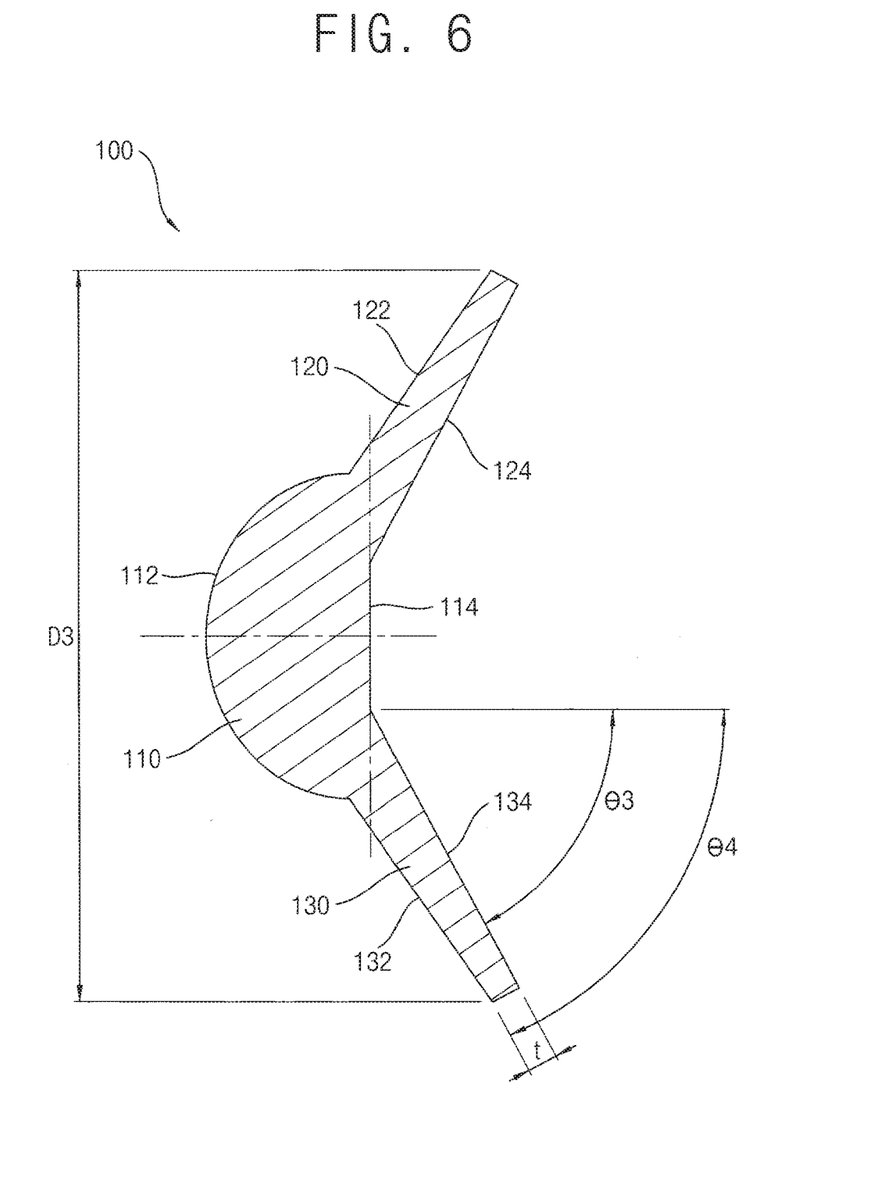
FIG. 6 is a cross-sectional view taken along a line VI-VI' in FIG. 5.

FIG. 2 is a front view illustrating a portion "A" in FIG. 1, FIG. 3 is a front view illustrating a portion "C" in FIG. 2, FIG. 4 is a cross-sectional view illustrating a locking portion between an arm and a bucket in accordance with example embodiments, FIG. 5 is a plan view illustrating a dust preventing seal in accordance with example embodiments, and FIG. 6 is a cross-sectional view taken along a line VI-VI' in FIG. 5.

Referring to FIGS. 2 and 3, the arm 54 and the bucket-combining member 56a may be connected with each other by a fixing pin 60 at the first locking portion A. The fixing pin 60 may pass through a hole 54a in the arm 54. The fixing pin 60 may be fixed to the bucket-combining member 56a. For example, the fixing pin 60 may include a bush. The bucket-combining member 56a may be configured to surround both sides of the arm 54. A dust preventing seal 100 may be arranged between the arm 54 and the bucket-combining member 56a. That is, the two dust preventing seals 100 may be arranged at the both sides of the arm 54 in the first locking portion A. The dust preventing seal 100 may be configured to surround the fixing pin 60, the arm 54 and the bucket-combining member 56a to prevent dusts from infiltrating into a locking portion between the arm 54 and the bucket-combining member 56a. The locking portion between the arm 54 and the bucket-combing portion 56a may correspond to a contact portion between the arm 54 and the bucket-combining member 56a at a peripheral of the fixing pin 60.

Referring again to FIG. 1, the push link 58 and the bucket-combining member 56a may be connected with each other by a fixing pin at the second locking portion B. The fixing pin may be fixed to the bucket-combining member 56a through the push link 58. The fixing pin may include a bush. The bucket-combining member 56a may be configured to surround both sides of the push link 58. The dust preventing seal 100 may be arranged between the push link 58 and the bucket-combining member 56a. That is, the two dust preventing seals 100 may be arranged at the both sides of the push link 58 in the second locking portion B. The dust preventing seal 100 may be configured to surround the fixing pin, the push link 58 and the bucket-combining member 56a to prevent dusts from infiltrating into a locking portion between the push link 58 and the bucket-combining member 56a.

Referring to FIG. 4, the arm 54 and the bucket-combining member 56a may have inclined corners at the locking portion between the arm 54 and the bucket-combining member 56a. That is, the corner of the arm 54 at the locking portion may have an inclined chamfer at a first angle θ1. The corner of the bucket-combining member 56a at the locking portion may have an inclined chamfer at a second angle θ2. For example, the first angle θ1 and the second angle θ2 may be about 40° to about 50°. In example embodiments, the first angle θ1 and the second angle θ2 may be about 45°. Thus, the locking portion between the arm 54 and the bucket-combining member 56a may have a V-shaped cross section. A width of the V-shaped locking portion may be a first distance D1. The dust preventing seal 100 may be received in the V-shaped locking portion.

A gap having a second distance D2 may be generated between the arm 54 and the bucket-combining member 56a during the construction machine may be operated. The dusts generated from soils and stones may infiltrate through the gap. The dusts may wear parts in the locking portion.

The dust preventing seal 100 may have a width (a third distance D3) less than the first distance D1 of the V-shaped locking portion and greater than the second distance D2 of the gap between the arm 54 and the bucket-combining member 56a. Therefore, the dust preventing seal 100 may be fully received in the V-shaped locking portion to prevent the infiltrations of the dusts into the gap between the arm 54 and the bucket-combining member 56a.

Referring to FIGS. 5 and 6, the dust preventing seal 100 may include a body 110, a first dust lip 120 and a second dust lip 130. The body 100 may be configured to surround the locking portion between the arm 54 and the bucket-combining member 56a. The first and second dust lips 120 and 130 may be protruded from the body 110 to the outside.

The body 110 may have an annular shape configured to surround the locking portion between the arm 54 and the bucket-combining member 56a. The body 110 may be received in the V-shaped locking portion between the arm 54 and the bucket-combining member 56a to prevent the infiltrations of the dusts into the gap between the arm 54 and the bucket-combining member 56a.

As shown in FIG. 6, the body 110 may have a semi-circular cross section. The body 110 may have a semi-circular inner surface 112. The inner surface 112 of the body 110 may be configured to make contact with the arm 54 and the bucket-combining member 56a. The body 110 may have a linear outer surface 114. The outer surface 114 of the body 110 may be exposed to the outside to make contact with the dusts. The first dust lip 120 and the second dust lip 130 may be extended from both ends of the outer surface 114 of the body 110.

The first dust lip 120 and the second dust lip 130 may be inclined to the outer surface 114 of the body 110 at a same angle. The first dust lip 120 and the second dust lip 130 may be spaced apart from each other. Thus, the dust preventing seal 100 may have the V-shaped cross section. Alternatively, the shape of the dust preventing seal 100 may not be restricted within the V shape. For example, the dust preventing seal 100 may have a U-shaped cross section. The first dust lip 120 may have an inner surface 122 configured to make contact with the arm 54, and an outer surface 124 exposed to the outside. The second dust lip 130 may have an inner surface 132 configured to make contact with the bucket-combining member 56a, and an outer surface 134 exposed to the outside. The outer surfaces 124 and 134 of the first and second dust lips 120 and 130 may make contact with the dusts. The first and second dust lips 120 and 130 may be slantly extended from the outer surface 114 of the body 110 to increase a dust contact area of the dust preventing seal 100.

In example embodiments, the first and second dust lips 120 and 130 may have a gradually decreased thickness t from the outer surface 114 of the body 110 along a radius direction of the body 110.

Particularly, the outer surface 134 of the second dust lip 130 may be inclined to a direction substantially perpendicular to the outer surface 114 of the body 110 at a third angle θ3. The inner surface 132 of the second dust lip 130 may be inclined to the direction substantially perpendicular to the outer surface 114 of the body 110 at a fourth angle θ4. The third angle θ3 may be greater than the fourth angle θ4. The third angle θ3 may be about 55° to about 70°. The fourth angle θ4 may be about 50° to about 60°. In example embodiments, The third angle θ3 may be about 62°. The fourth angle θ4 may be about 55°. Therefore, the thickness t of the second dust lip 130 may be thinner along the radius direction of the body 110. Similarly, the thickness of the first dust lip 120 may be thinner along the radius direction of the body 110.

The width of the dust preventing seal 100 may be defined by a length between an end of the first dust lip 120 and an end of the second dust lip 130. The width of the dust preventing seal 100 may be the third distance D3. In example embodiments, the third distance D3 of the dust preventing seal 100 may be less than the first distance D1 of the V-shaped locking portion between the arm 54 and the bucket-combining member 56a. For example, the first distance D1 may be about 23 mm and the third distance D3 may be about 20 mm. Thus, the dust preventing seal 100 may be fully received in the V-shaped locking portion between the arm 54 and the bucket-combining member 56a.

In example embodiments, the dust preventing seal 100 may include an elastic material such as a rubber. Thus, when the dusts may infiltrate into the gap, the dust preventing seal 100 may be elastically deformed. The elastically deformed dust preventing seal 100 may closely make contact with the arm 54 and the bucket-combining member 56a to effectively prevent the infiltrations of the dusts.

Particularly, when the dusts may infiltrate into the locking portion, the dusts may make contact with the outer surface 114 of the body 110, the outer surface 124 of the first dust lip 120 and the outer surface 134 of the second dust lip 134 so that the dusts may compress the dust preventing seal 100 toward the fixing pin 60. Because the arm 54 and the bucket-combining member 56a may be inclined in the V shape at the locking portion, the widths of the arm 54 and the bucket-combining member 56a may be gradually decreased. Thus, the compressed first and second dust lips 120 and 130 may closely make contact with the inclined surfaces of the arm 54 and the bucket-combining member 56a. That is, the dusts may function as to increase a contact force of the dust preventing seal 100 to the arm 54 and the bucket-combining member 56a to prevent the infiltrations of the dusts into the locking portion.

According to example embodiments, the dust preventing seal 100 may be arranged between the arm 54 and the bucket 56 to prevent the infiltrations of the dusts. The V-shaped locking portion may be formed between the arm 54 and the bucket 56. The dust preventing seal 100 may also include the first and second dust lips 120 and 130 having the V shape. Thus, the dust preventing seal 100 may be fully received in the V-shaped locking portion between the arm 54 and the bucket 56. The dust preventing seal 100 may closely make contact with the V-shaped locking portion due to the load of the dusts to prevent the infiltrations of the dusts.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A dust preventing seal comprising:
    an annular body installed at a locking portion between an arm and a bucket of a construction machine; and
    first and second dust lips protruded from an outer surface of the annular body to an outside,
    wherein the locking portion between the arm and the bucket has a V-shaped chamfer formed on outer surfaces of the arm and the bucker, and the annular body is received in the V-shaped chamfer,
    wherein a distance between an end of the first dust lip and an end of the second dust lip measured along a radial direction of the annular body is less than a width of the V-shaped chamfer, and
    wherein the annular body has a semi-circular cross section, a semi-circular inner surface configured to make contact with the arm and the bucket in the V-shaped chamfer, and a linear outer surface exposed to the outside.

2. The dust preventing seal of claim 1, wherein the arm and the bucket have corners that form the V-shaped chamfer of the locking portion, and the corners are inclined at an angle of about 40° to about 50°.

3. The dust preventing seal of claim 1, wherein the first and second dust lips have a gradually decreased thickness from the outer surface of the annular body along a radius direction of the annular body.

4. The dust preventing seal of claim 1, wherein
    the first and second dust lips have outer surfaces exposed to the outside for making contact with dusts,
    the outer surfaces of the first and second dust lips are inclined to the outer surface of the annular body at an angle of about 55° to about 70°,
    the first and second dust lips have inner surfaces configured to make contact with the locking portion, and
    the inner surfaces of the first and second dust lips are inclined to the outer surface of the annular body at an angle of about 50° to about 60°.

5. A construction machine comprising:
    a connecting member partially received in a hole of an arm to connect the arm with a bucket; and
    a dust preventing seal including an annular body and first and second dust lips, the annular body installed at a locking portion between the arm and the bucket, and first and second dust lips protruded from an outer surface of the annular body to an outside,
    wherein the locking portion between the arm and the bucket has a V-shaped chamfer formed on outer surfaces of the arm and the bucker, and the annular body is received in the V-shaped chamfer, and
    wherein a distance between an end of the first dust lip and an end of the second dust lip measured along a radial direction of the annular body is less than a width of the V-shaped chamfer, and
    wherein the annular body has a semi-circular cross section, a semi-circular inner surface configured to make contact with the arm and the bucket in the V-shaped chamfer, and a linear outer surface exposed to the outside.

* * * * *